(12) United States Patent
Luo et al.

(10) Patent No.: US 12,408,154 B2
(45) Date of Patent: *Sep. 2, 2025

(54) WIRELESS DEVICES AND SYSTEMS INCLUDING EXAMPLES OF CONFIGURATION MODES FOR BASEBAND UNITS AND REMOTE RADIO HEADS

(71) Applicant: Lodestar Licensing Group LLC, Evanston, IL (US)

(72) Inventors: Fa-Long Luo, San Jose, CA (US); Jaime Cummins, Bainbridge Island, WA (US); Tamara Schmitz, Scotts Valley, CA (US); Jeremy Chritz, Seattle, WA (US)

( * ) Notice: Subject to any disclaimer, the term of this patent is extended or adjusted under 35 U.S.C. 154(b) by 785 days.

This patent is subject to a terminal disclaimer.

(21) Appl. No.: 17/655,742

(22) Filed: Mar. 21, 2022

(65) Prior Publication Data

US 2022/0287037 A1 Sep. 8, 2022

Related U.S. Application Data

(63) Continuation of application No. 16/893,740, filed on Jun. 5, 2020, now Pat. No. 11,284,394, which is a
(Continued)

(51) Int. Cl.
*H04W 72/0453* (2023.01)
*H04B 10/2575* (2013.01)
(Continued)

(52) U.S. Cl.
CPC .... *H04W 72/0453* (2013.01); *H04B 10/2575* (2013.01); *H04W 72/29* (2023.01);
(Continued)

(58) Field of Classification Search
CPC .. H04W 72/0453; H04W 72/54; H04W 72/29
See application file for complete search history.

(56) References Cited

U.S. PATENT DOCUMENTS 6,580,721 B1    6/2003  Beshai
8,583,063 B1   11/2013  Lee et al.
(Continued)

FOREIGN PATENT DOCUMENTS

CN    102883355 A    1/2013
CN    103947248 A    7/2014
(Continued)

OTHER PUBLICATIONS

U.S. Appl. No. 18/306,694 titled "Wireless Devices and Systems Including Examples of Configuration Modes Forbaseband Units and Remote Radio Heads," filed Apr. 25, 2023; pp. all pages of application as filed.

(Continued)

*Primary Examiner* — Samina F Choudhry
(74) *Attorney, Agent, or Firm* — Dorsey & Whitney LLP

(57) ABSTRACT

Examples described herein include systems and methods which include wireless devices and systems with examples of configuration modes for baseband units (BBU) and remote radio heads (RRH). For example, a computing system including a BBU and a RRH may receive a configuration mode selection including information indicative of a configuration mode for respective processing units of the BBU and the RRH. The computing system may allocate the respective processing units to perform wireless processing stages associated with a wireless protocol. The BBU and/or the RRH may generate an output data stream based on the mixing of coefficient data with input data at the BBU and/or the RRH. Examples of systems and methods described herein may facilitate the processing of data for 5G (e.g., New Radio (NR)) wireless communications in a power-efficient and time-efficient manner.

17 Claims, 10 Drawing Sheets

Related U.S. Application Data continuation of application No. 15/693,122, filed on Aug. 31, 2017, now Pat. No. 10,716,110, which is a continuation-in-part of application No. 15/447,699, filed on Mar. 2, 2017, now Pat. No. 10,070,432.

(51) Int. Cl.
*H04W 72/29* (2023.01)
*H04W 72/541* (2023.01)
*H04L 67/12* (2022.01)
*H04W 88/08* (2009.01)

(52) U.S. Cl.
CPC ........... *H04W 72/541* (2023.01); *H04L 67/12* (2013.01); *H04W 88/085* (2013.01); *Y02D 30/70* (2020.08)

(56) References Cited

U.S. PATENT DOCUMENTS

| | | | |
|---|---|---|---|
| 9,112,758 | B2 | 8/2015 | Niu et al. |
| 9,634,615 | B1 | 4/2017 | Ahmed et al. |
| 9,942,074 | B1 | 4/2018 | Luo et al. |
| 10,070,432 | B1 | 9/2018 | Luo et al. |
| 10,716,110 | B2 | 7/2020 | Luo et al. |
| 10,999,835 | B2 | 5/2021 | Luo et al. |
| 11,284,394 | B2 | 3/2022 | Luo et al. |
| 11,665,710 | B2 | 5/2023 | Luo et al. |
| 12,089,232 | B2 | 9/2024 | Luo et al. |
| 2006/0256216 | A1 | 11/2006 | Takahiko et al. |
| 2007/0201582 | A1 | 8/2007 | Okada et al. |
| 2010/0297957 | A1 | 11/2010 | Rofougaran |
| 2011/0151812 | A1 | 6/2011 | Kang et al. |
| 2012/0081566 | A1 | 4/2012 | Côté et al. |
| 2013/0241757 | A1 | 9/2013 | Morris |
| 2014/0194158 | A1 | 7/2014 | Gong et al. |
| 2014/0376926 | A1 | 12/2014 | Weiner et al. |
| 2015/0372738 | A1 | 12/2015 | Negus et al. |
| 2016/0254889 | A1 | 9/2016 | Shattil |
| 2016/0330630 | A1 | 11/2016 | Yoo et al. |
| 2017/0230780 | A1 | 8/2017 | Chincholi et al. |
| 2017/0318470 | A1 | 11/2017 | Srikanteswara et al. |
| 2018/0255546 | A1 | 9/2018 | Luo et al. |
| 2018/0255552 | A1 | 9/2018 | Luo et al. |
| 2018/0359744 | A1 | 12/2018 | Luo et al. |
| 2020/0305161 | A1 | 9/2020 | Luo et al. |
| 2021/0195585 | A1 | 6/2021 | Luo et al. |
| 2023/0262731 | A1 | 8/2023 | Luo et al. |

FOREIGN PATENT DOCUMENTS

| | | |
|---|---|---|
| CN | 105474733 A | 4/2016 |
| CN | 106304420 A | 1/2017 |
| CN | 106464621 A | 2/2017 |
| CN | 110024345 A | 7/2019 |
| EP | 2635087 A1 | 9/2013 |
| TW | 201545574 A | 12/2015 |
| TW | 201611560 A | 3/2016 |
| WO | 2005008926 A1 | 1/2005 |
| WO | 2016099748 A1 | 6/2016 |
| WO | 2018160753 A1 | 9/2018 |

OTHER PUBLICATIONS

U.S. Appl. No. 16/893,740, titled "Wireless Devices and Systems Including Examples of Configuration Modes for Baseband Units and Remote Radio Heads", dated Jun. 5, 2020, pp. all pages of application as filed.

U.S. Appl. No. 17/190,349 titled "Wireless Devices and Systems Including Examples of Configuration Modes for Baseband Units and Remote Radio Heads", filed Mar. 2, 2021, pp. all pages of application as filed.

U.S. Appl. No. 16/048,075 titled "Wireless Devices and Systems Including Examples of Configuration Modes for Baseband Units and Remote Radio Heads", filed Jul. 27, 2018, pp. all pages of application as filed.

U.S. Appl. No. 15/693,122, entitled "Wireless Devices and Systems Including Examples of Configuration Modes for Baseband Units and Remote Radio Heads", filed Aug. 31, 2017, pp. all pages of application as filed.

U.S. Appl. No. 15/447,699 entitled "Wireless Devices and Systems Including Examples of Configuration Modes for Baseband Units and Remote Radio Heads", filed Mar. 2, 2017, pp. all pages of application as filed.

Luo, et al., Signal Processing for 5G: Algorithms and Implementations, IEEE—Wiley; Oct. 2016, pp. 431-455.

Rauwerda, Gerard et al., "Towards Software Defined Radios Using Coarse-Grained Reconfigurable Hardware", IEEE Transactions on Very Large Scale Integration Systems, vol. 16, No. 1, Jan. 2008, Jan. 2008, 11 pgs.

WIRELESS DEVICES AND SYSTEMS INCLUDING EXAMPLES OF CONFIGURATION MODES FOR BASEBAND UNITS AND REMOTE RADIO HEADS

CROSS REFERENCE TO RELATED APPLICATION(S)

This application is a Continuation of U.S. patent application Ser. No. 16/893,740 filed Jun. 5, 2020 and issued as U.S. Pat. No. 11,284,394 on Mar. 22, 2022, which is a continuation of U.S. patent application Ser. No. 15/693,122 filed Aug. 31, 2017 and issued as U.S. Pat. No. 10,716,110 on Jul. 14, 2020, which is a Continuation-in-Part of U.S. patent application Ser. No. 15/447,699 filed Mar. 2, 2017 and issued as U.S. Pat. No. 10,070,432 on Sep. 4, 2018. The aforementioned applications, and issued patents, are incorporated herein by reference, in their entirety, for any purpose.

BACKGROUND

Digital signal processing for wireless communications, such as digital baseband processing or digital front-end implementations, may be implemented using hardware (e.g. silicon) computing platforms. For example, multimedia processing and digital radio frequency (RF) processing may be accomplished by an application-specific integrated circuit (ASIC) which may implement a digital front-end for a wireless transceiver. A variety of hardware platforms are available to implement digital signal processing, such as the ASIC, a digital signal processor (DSP) implemented as part of a field-programmable gate array (FPGA), or a system-on-chip (SoC). However, each of these solutions often requires implementing customized signal processing methods that are hardware-implementation specific. For example, a digital signal processor may implement a specific portion of digital processing at a cellular base station, such as filtering interference based on the environmental parameters at that base station. Each portion of the overall signal processing performed may be implemented by different, specially-designed hardware, creating complexity.

Moreover, there is interest in moving wireless communications to "fifth generation" (5G) systems. 5G offers promise of increased speed and ubiquity, but methodologies for processing 5G wireless communications have not yet been set.

DETAILED DESCRIPTION

Figure 1:
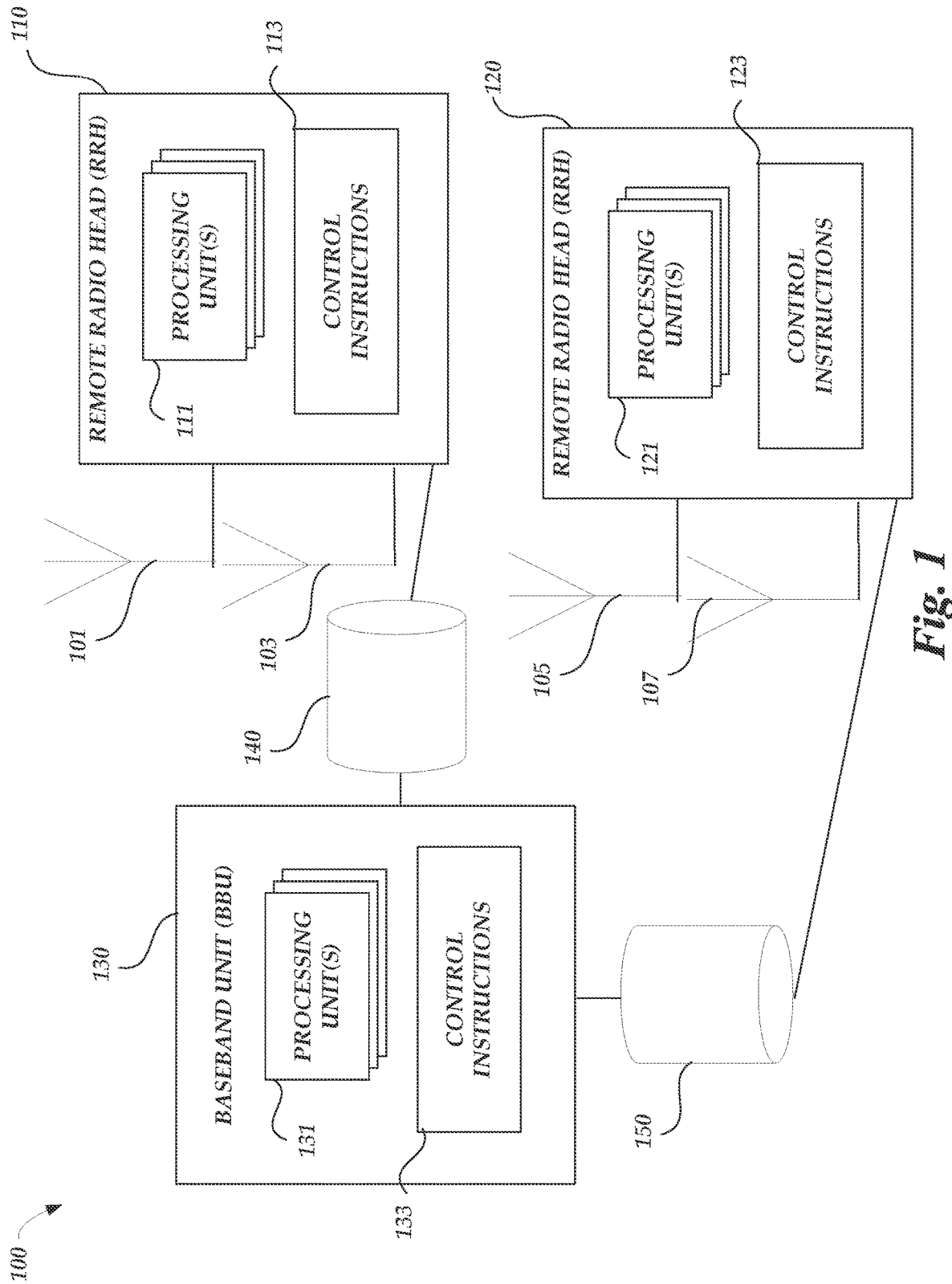
FIG. 1 is a schematic illustration of a computing system arranged in accordance with examples described herein.

There is interest in moving wireless communications to "fifth generation" (5G) systems. 5G offers promise of increased speed and ubiquity, but methodologies for processing 5G wireless communications have not yet been set. For example, some wireless processing stages may be implemented in an existing base station and other wireless processing may be implemented in a cloud computing network. The lead time in designing and manufacturing a hardware platform for wireless communications can be significant. Accordingly, it may be advantageous in some examples to design and/or process a hardware platform for 5G wireless communication that may process wireless communications, dynamically in either a cloud computing network or existing wireless structures (e.g., a wireless base station) using a reconfigurable architecture. In this manner the architecture utilized by a 5G wireless communication system may not need to be decided until after the platform is designed and/or fabricated.

Examples described herein include wireless devices and systems which may implement wireless processing stages using baseband units (BBUs) and remote radio heads (RRHs). In some examples, a BBU and one or more RRHs may form a cloud radio access network (C-RAN). A C-RAN may include base station functionality that is divided between RRHs and baseband units BBUs. An RRH may perform RF amplification, up/down conversion, filtering, ADC, or DAC to provide a baseband signal to a BBU. A BBU may process the baseband signals and optimize resource allocation among the RRHs. A fronthaul interface may be a link between an RRH and a BBU that may perform compression of the baseband signal to send the signal to the BBU and that may additionally perform estimation of the fronthaul link to compensate for any effects the fronthaul has on the baseband signal during transmission to the BBU. As described herein, reconfigurable hardware platforms may be utilized to implement a BBU and RRHs, together implementing a reconfigurable C-RAN.

A reconfigurable hardware platform may allocate processing units to implement/perform wireless processing stages, such as wireless processing stages of a 5G wireless communication system. A hardware platform that can change the provision of instructions or a type of instructions to certain processing units, for example, while executing instructions on certain other processing units may be referred to as reconfigurable. A reconfigurable hardware platform, such as a reconfigurable fabric (e.g., an integrated circuit having the functionality of a reconfigurable hardware platform), may change types of instructions sent to certain processing units. Some processing units on the reconfigurable hardware platform may be executing or performing a certain functionality, such as adding or accumulating, and the processing units may be reconfigured to receive different instructions that can alter or change their respective functionalities. Accordingly, a processing unit that is executing instructions to add operands may be changed to a processing unit that is executing instructions to accumulate operands. Such a reconfigurable hardware platform can increase the rate of instruction execution and improve the efficiency of instruction set execution, such as providing instruction sets to certain processing units that are available. Such advantages related to rate of instruction execution or efficiency of instruction set execution can lead to faster processing time of reconfigurable hardware platforms over a conventional ASIC or a specially-configured digital signal processing (DSP) unit.

A reconfigurable hardware platform may mix coefficient data with input data (e.g., a data stream to be transmitted) to implement a portion of the wireless processing stages to either generate an intermediate processing result or output data (e.g., an output data stream). The input data may be any data that is input for digital signal processing. The coefficient data may be any data that is specific to one or more wireless processing stages. For example, some wireless processing stages may be associated with specific wireless protocols. Examples of wireless protocols include, but are not limited to, a 5G wireless system utilizing a wireless protocol such as filter bank multi-carrier (FBMC), the generalized frequency division multiplexing (GFDM), universal filtered multi-carrier (UFMC) transmission, bi-orthogonal frequency division multiplexing (BFDM), orthogonal frequency-division multiple access (OFDMA), sparse code multiple access (SCMA), non-orthogonal multiple access (NOMA), multi-user shared access (MUSA) and faster-than-Nyquist (FTN) signaling with time-frequency packing.

Generally, any wireless protocol including any 5G wireless protocol may be represented by coefficient data as disclosed herein. The input data may be mixed with the coefficient data to generate an intermediate processing result or output data. For example, a computing system including a reconfigurable architecture with processing units may mix the input data (e.g., a data stream to be transmitted) with coefficient data to generate an intermediate processing result that is representative of the transmission being processed according to the wireless protocol. In some examples, the computing system generates an approximation of the intermediate processing result. For example, the output data may be an approximation of the intermediate processing result generated when input data is processed in hardware (e.g., an FPGA) specifically-designed to implement the wireless protocol that the coefficients correspond to.

Advantageously in some examples, the systems and methods described herein may operate according to multiple standards and/or with multiple applications, including changes or upgrades to each thereto; in contrast to the inflexible framework of an ASIC-based solution. In some examples, as discussed herein in terms of processing units implementing multiplication, addition, or accumulation functionalities, examples of the systems and methods described herein may operate on a power-efficient framework, consuming minimal power with such functionalities; in contrast to a power-hungry framework of a FPGA/DSP-based solution. In some examples, systems and methods described herein may operate with a substantially integrated framework from a unified programming language perspective; in contrast to the various programming languages needed for integration of a SoC solution that may pose programming challenges when implementing heterogeneous interfaces for control units, computational units, data units and accelerator units.

Examples described herein include systems and methods which include BBUs and RRHs, implemented on respective reconfigurable fabrics. In some examples, the computing device may receive a configuration mode selection, for example, a configuration mode selection from a user interacting with the computing system. A processing mode selection can indicate specific configuration mode for the BBU and RRH. Control instructions may utilize a configuration mode selection to allocate respective processing units of the respective reconfigurable fabrics for processing of input data to generate output data.

In utilizing the configuration mode selection, wireless processing stages may be allocated as between the BBU and the RRH. For example, the configuration mode selection may indicate which wireless processing stages will be implemented on the BBU and which will be implemented on the RRH. The BBU(s) and RRH(s) may then accordingly reconfigure themselves to implement the appropriate stages without requiring changes to the BBU and/or RRH hardware. For example, a BBU may receive the input data and load instruction sets, based on the configuration mode, into respective processing units to perform some wireless processing stages at the BBU. In performing some wireless processing stages at the BBU, the BBU may generate an intermediate processing result based on mixing the input data with coefficient data specific to the wireless processing stages at the BBU. The intermediate processing result may correspond to the result of the wireless processing stages operating on the input data.

In some examples, the RRH may receive the intermediate processing result and load additional instruction sets, based on the configuration mode, into respective processing units to perform additional wireless processing stages at RRH. In performing the additional wireless processing stages at the RRH, the RRH may generate a corresponding output data based on mixing the intermediate processing result with coefficient data specific to the additional wireless processing stages at the RRH. Generally, any wireless processing stage of a wireless protocol can be represented by coefficient data, which, in turn, may be utilized to mix input data or an intermediate processing result to generate, respectively, the intermediate processing result or the output data. Some wireless processing stages can include a Turbo coding processing stage, a modulation processing stage, a massive MIMO processing stage, and digital front-end processing stages. An RRH and a BBU may perform a subset of processing stages to generate an output data stream for a wireless transmission. In some cases, additional processing stages can be included at either the RRH or the BBU, and an order of the processing stages may change as specified in a configuration mode.

FIG. 1 is a schematic illustration of a computing system 100 arranged in accordance with examples described herein. The computing system 100 includes remote radio heads (RRHs) 110, 120, each coupled to baseband unit (BBU) 130 via a respective fronthaul link 140, 150. RRH 110, which may be implemented on a reconfigurable fabric, includes processing units 111 and control instructions 113. The control instructions 113 may be stored on non-transitory computer readable media, for example, as encoded executable instructions, which, when executed by the reconfigurable fabric, is configured to cause the apparatus RRH 110 to perform certain operations described herein. The RRH 110 is coupled to antennas 101, 103. The RRH 110 may be in communication with antennas 101, 103 to transmit or receive wireless communication signals, for example, modulated RF signals on a specific wireless band. RRH 120, which may also be implemented on a reconfigurable fabric, includes processing units 121 and control instructions 123. The RRH 120 is coupled to antennas 105, 107. The RRH 120 may be in communication with antennas 105, 107 to transmit or receive wireless communication signals, for example, modulated RF signals on a specific wireless band. RRH 120 may be transmitting or receiving on the same wireless band as RRH 110 or on a different wireless band. Control instructions 113, 123 may configure the respective RRHs 110, 120 for specific configuration modes. Control instructions 113 and 123 may be locally implemented on each respective RRH. In some examples, control instructions 113 and 123 may be the same control instructions implemented at a RRH 110 and communicated, as control signals, to RRH 120, or vice versa.

The BBU 130, which may be implemented on a reconfigurable fabric, includes processing units 131 and control instructions 133. The control instructions 133 may configure the BBU 130 for a specific configuration mode. The control instructions 133 may be stored on non-transitory computer readable media encoded with executable instructions which, when executed by the reconfigurable fabric, is configured to cause the BBU 130 to perform certain operations described herein. In some examples, control instructions 133 may be the same control instructions 113, 123 implemented at RRHs 110, 120, respectively. In such examples, the control instructions may be implemented at one entity (e.g., BBU 130 or RRH 110) and be communicated to the other entities as control signals that configure each entity for a specific configuration mode.

Each of the processing unit(s) 111, 121, 131 may be implemented using one or more operand processing units, such as an arithmetic logic unit (ALU), a bit manipulation unit, a multiplication unit, an accumulation unit, an adder unit, a look-up table unit, a memory look-up unit, or any combination thereof. In some examples, each of the processing unit(s) 111, 121, 131 may include circuitry, including custom circuitry, and/or firmware for performing functions described herein. For example, circuitry can include multiplication unit/accumulation units for performing the described functions, as described herein. Each of the processing unit(s) 111, 121, 131 can be implemented as a microprocessor or a digital signal processor (DSP), or any combination thereof. For example, processing unit(s) 111, 121, 131 can include levels of caching, such as a level one cache and a level two cache, a core, and registers. An example processor unit can include. Examples of processing unit(s) 111, 121, 131 are described herein, for example with reference to FIG. 2.

Fronthaul link 140 may communicate information between RRH 110 and BBU 130. BBU 130 may compress information (e.g., via a compression algorithm) to be transmitted over the fronthaul link 140 at a specific bandwidth supported by the fronthaul link 140. RRH 110 may also compress information to be transmitted over the fronthaul link 140. Execution of the control instructions 133 or control instructions 113 may determine a threshold amount of information to transmit to/from the BBU 130 or RRH 110 based on a processing time of the BBU, a processing time of the RRH, and a transmission time over the fronthaul link 140. Execution of the control instructions 133 or control instructions 113 may compare a summation time of the processing time of the RRH and transmission time over the fronthaul link 140 to the processing time of the BBU. If the processing time of the BBU is less than the summation time of the processing time of the RRH and transmission time over the fronthaul link 140, then, during execution of the control instructions 133 or control instructions 113, a determination may be made that at least one of wireless processing stages included in the RRH 110 may be processed at the BBU 130, which may achieve an overall lower processing time for the system 100. In such a case, as described herein, execution of the control instructions 133 or control instructions 113 may allocate some of the processing units 131 to perform the at least one wireless processing stage determined to be of less overall processing time at the BBU 130.

In some examples, an external user or computing system may compare the processing times and generate a configuration mode selection based on the comparison of processing times. The configuration mode selection may specify whether the RRH 110 or the BBU 130 is to perform certain wireless processing stages of a wireless protocol, as described herein with reference to FIG. 3. A computer readable-media executing the control instructions 133 or control instructions 113 may continuously evaluate processing times at the BBU 130 and the RRH 110 to determine whether an overall processing time may be reduced by allocating different wireless processing stages to either the BBU 130 or the RRH, for example, by configuring the BBU 130 or the RRH 110 for a specific configuration mode.

Fronthaul link 150 may communicate information between RRH 120 and BBU 130. BBU 130 may compress information (e.g., via a compression algorithm) to be transmitted over the fronthaul link 150 at a specific bandwidth supported by the fronthaul link 150. RRH 120 may also compress information to be transmitted over the fronthaul link 150. Execution of the control instructions 133 or control instructions 123 may include a determination of a processing time threshold to transmit to/from the BBU 130 or RRH 120 the compressed information based on a processing time of the BBU, a processing time of the RRH, and a transmission time over the fronthaul link 150.

Execution of the control instructions 133 or control instructions 123 may include a comparison of a summation time of the processing time of the RRH and transmission time over the fronthaul link 150 to the processing time of the BBU. The summation time of the processing time of the RRH and transmission time over the fronthaul link 150 may define the processing time threshold, such that if the processing time threshold is passed, execution of the control instructions 133 or control instructions 123 may include an alteration of the configuration mode. If the processing time of the BBU is less than the summation time of the processing time of the RRH and transmission time over the fronthaul link 150, then the execution of the control instructions 133 or control instructions 123 may include a determination that at least one of wireless processing stages included in the RRH 120 may be processed at the BBU 130, which may achieve an overall lower processing time for the system 100. In such a case, as described herein, execution of the control instructions 133 or control instructions 123 may include an allocation of some of the processing units 131 to perform the at least one wireless processing stage determined to be of less overall processing time at the BBU 130.

In some examples, an external user or computing system may compare the processing times and generate a configuration mode selection according to the comparison of processing times. The configuration mode selection may specify whether the RRH 120 or the BBU 130 is to perform certain wireless processing stages of a wireless protocol, as described herein with reference to FIG. 3. A computer readable-media executing the control instructions 133 or control instructions 123 may continuously evaluate processing times at the BBU 130 and the RRH 120 to determine whether an overall processing time may be reduced by allocating different wireless processing stages to either the BBU 130 or the RRH, for example, by configuring the BBU 130 or the RRH 120 for a specific configuration mode.

As described above, the BBU 130 may operate in a configuration mode for the RRH 110 and a configuration mode for the 120. In some examples, the configuration mode for the BBU may be the same for each respective RRH 110, 120; in which case, the BBU 130 may multiplex the reception and transmission of information to each RRH 110, 120. In some examples, the BBU 130 may operate in a first configuration mode for the RRH 110 and a second configuration mode for the RRH 120. In such a case, the BBU may allocate processing unit(s) 131 for each RRH 110, 120, such that the overall processing time of the computing system 100 is reduced among the processing times of the BBU 130, the RRH 110, the RRH 120 and the transmission times of the fronthaul links 140, 150.

The entities of the computing system 100 described herein, such as the RRH 110, the RRH 120, and/or the BBU 130 shown in FIG. 1, may be implemented using generally any electronic device for which communication capability is desired. For example, the BBU 130 may be implemented using a server or a combination of servers. The RRH 110, 120 may be implemented using a mobile phone, smartwatch, computer (e.g. a server, laptop, tablet, desktop), or radio. In some examples, the RRH 110 and/or the RRH 120 may be incorporated into and/or in communication with other apparatuses for which communication capability is desired, such as but not limited to, a wearable device, a medical device, an automobile, airplane, helicopter, appliance, tag, camera, or other device. In various embodiments, the RRH 110 or the RRH 120 may be a wireless base station, such as those installed in cellular wireless communication networks.

While not explicitly shown in FIG. 1, the RRH 110, the RRH 120, and/or the BBU 130 may include any of a variety of components in some examples, including, but not limited to, memory, input/output devices, circuitry, processing units (e.g. processing elements and/or processors), or combinations thereof.

The RRH 110 and the RRH 120 may each include multiple antennas. For example, the RRH 110 and the RRH 120 may each have more than two antennas. Two antennas each are shown in FIG. 1, but generally any number of antennas may be used including 2, 3, 4, 5, 6, 7, 8, 9, 10, 11, 12, 13, 14, 15, 16, 32, or 64 antennas. Other numbers of antennas may be used in other examples. In some examples, the RRH 110 and the RRH 120 may have an identical number of antennas, as shown in FIG. 1. In other examples, the RRH 110 and the RRH 120 may have different numbers of antennas. Generally, systems described herein may include multiple-input, multiple-output ("MIMO") systems. MIMO systems generally refer to systems including one or more RRHs which transmit transmissions using multiple antennas and one or more RRHs which receive transmissions using multiple antennas. In some examples, RRHs may both transmit and receive transmissions using multiple antennas. As the number of antennas increase, so to generally does the complexity involved in accurately transmitting and/or receiving transmissions.

Although two RRHs (e.g. RRH 110 and RRH 120) are shown in FIG. 1, generally the system 100 may include any number of RRHs. In addition, while a single BBU 130 is shown in FIG. 1, generally the system 100 may include any number of BBUs coupled to respective RRHs. In some cases, an RRH of the system 100 may be coupled to one or more BBUs.

Figure 2:
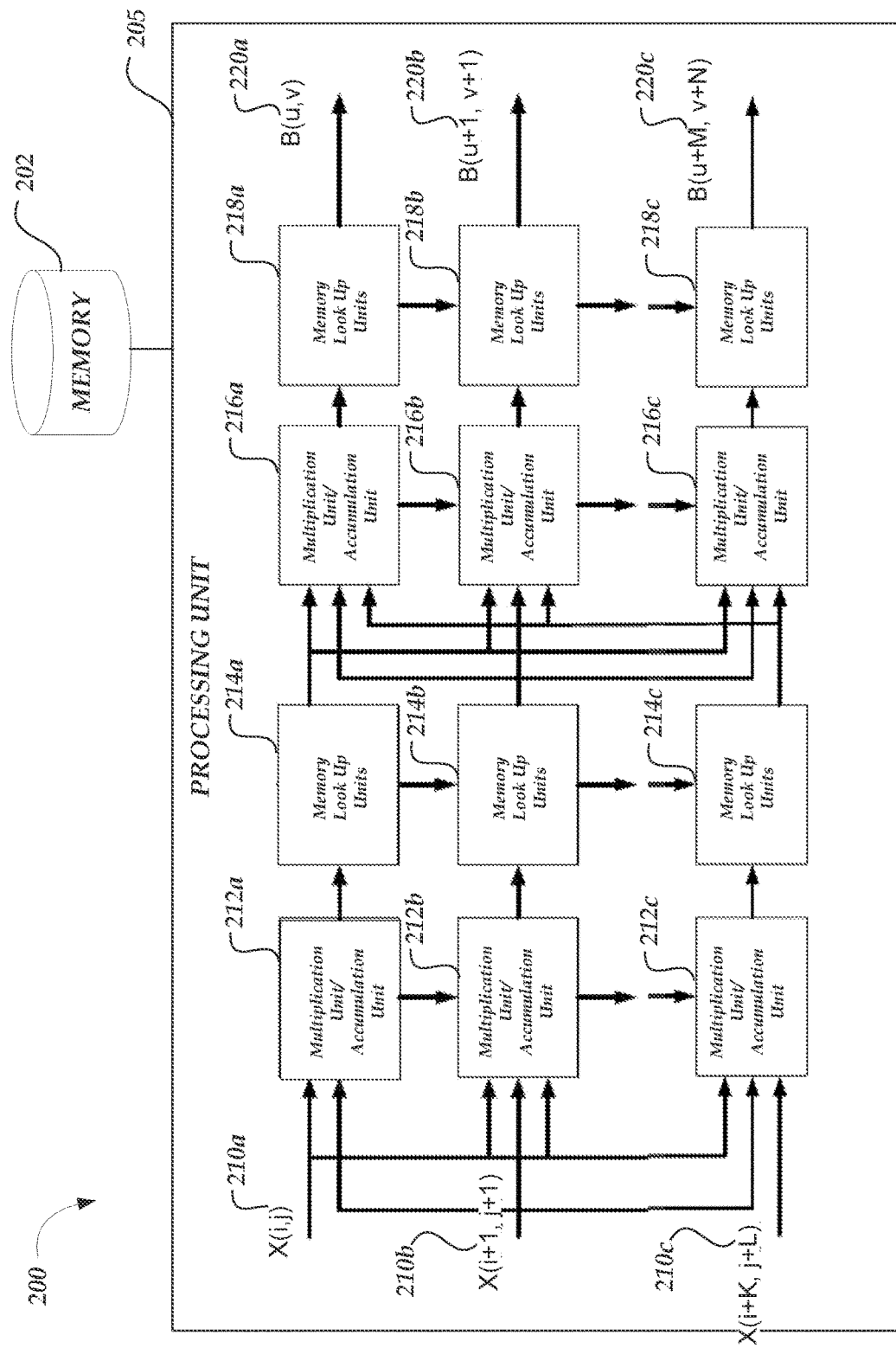
FIG. 2 is a schematic illustration of a computing system arranged in accordance with the example of FIG. 1.

FIG. 2 is a schematic illustration of a processing unit 205 arranged in a system 200 in accordance with examples described herein. The system 200 may be the RRH 110, the RRH 120, or the BBU 130, for example. The processing unit 205 may receive input data (e.g. X(i,j)) 210a-c from such a computing system. In some examples, the input data 210a-c may be input data, such as data to be transmitted in a wireless system, or an intermediate processing result. In some examples, the processing unit 205 may implement a specific configuration mode for a respective entity of the system 100. For example, the BBU 130 may process data to be transmitted at one or more processing unit(s) 131, each implemented as processing unit 205; and the RRH 110 may process an intermediate processing result at one or more processing unit(s) 111, each implemented as processing unit 205. The processing unit 205 may include multiplication unit/accumulation units 212a-c, 216a-c and memory lookup units 214a-c, 218a-c that, when mixed with coefficient data retrieved from the memory 202, may generate output data (e.g. B (u,v)) 220a-c. In some examples, the output data 220a-c may be an intermediate processing result or an output wireless data stream of a computing system, where the output data stream is to be transmitted via an antenna.

The multiplication unit/accumulation units 212a-c, 216a-c multiply two operands from the input data 210a-c to generate a multiplication processing result that is accumulated by the accumulation unit portion of the multiplication unit/accumulation units 212a-c, 216a-c. The multiplication unit/accumulation units 212a-c, 216a-c adds the multiplication processing result to update the processing result stored in the accumulation unit portion, thereby accumulating the multiplication processing result. For example, the multiplication unit/accumulation units 212a-c, 216a c may perform a multiply-accumulate operation such that two operands, M and N, are multiplied and then added with P to generate a new version of P that is stored in its respective multiplication unit/accumulation units. The memory look-up units 214a-c, 218a-c retrieve coefficient data stored in memory 202. For example, the memory look-up unit can be a table look-up that retrieves a specific coefficient. The output of the memory look-up units 214a-c, 218a-c is provided to the multiplication unit/accumulation units 212a-c, 216a c that may be utilized as a multiplication operand in the multiplication unit portion of the multiplication unit/accumulation units 212a-c, 216a-c. Using such a circuitry arrangement, the output data (e.g. B (u,v)) 220a-c may be generated from the input data (e.g. X(i,j)) 210a-c.

In some examples, coefficient data, for example from memory 202, can be mixed with the input data X(i,j) 210a-c to generate the output data B (u,v) 220a-c. The relationship of the coefficient data to the output data B (u,v) 220a-c based on the input data X(i,j) 210a-c may be expressed as:

$$B(u, v) = f\left(\sum_{m,n}^{M,N} a''_{m,n} f\left(\sum_{k,l}^{K,L} a'_{k,l} X(i+k, j+l)\right)\right) \quad (1)$$

where $\alpha'_{k,l}$, $\alpha''_{m,n}$ are coefficients for the first set of multiplication/accumulation units 212a-c and second set of multiplication/accumulation units 216a-c, respectively, and where f(●) stands for the mapping relationship performed by the memory look-up units 214a-c, 218a-c. As described above, the memory look-up units 214a-c, 218a c retrieve coefficients to mix with the input data. Accordingly, the output data may be provided by manipulating the input data with multiplication/accumulation units using a set of coefficients stored in the memory associated with a desired wireless protocol. The resulting mapped data may be manipulated by additional multiplication/accumulation units using additional sets of coefficients stored in the memory associated with the desired wireless protocol. The sets of coefficients multiplied at each stage of the processing unit 205 may represent or provide an estimation of the processing of the input data according to a wireless protocol in specifically-designed hardware (e.g., an FPGA).

Further, it can be shown that the system 200, as represented by Equation 1, may approximate any nonlinear mapping with arbitrarily small error in some examples and the mapping of system 200 is determined by the coefficients $\alpha'_{k,l}$, $a''_{m,n}$. For example, if such coefficient data is specified, any mapping and processing between the input data X(i,j) 210a-c and the output data B (u,v) 220a-c may be accomplished by the system 200. Such a relationship, as derived from the circuitry arrangement depicted in system 200, may be used to train an entity of the computing system 100 (e.g., the RRH 110 or the BBU 130) to generate coefficient data. For example, using Equation (1), an entity of the computing system 100 may compare input data to the output data to generate the coefficient data.

In the example of system 200, the processing unit 205 mixes the coefficient data with the input data X(i,j) 210a-c utilizing the memory look-up units 214a-c, 218a-c. In some examples, the memory look-up units 214a-c, 218a-c can be referred to as table look-up units. The coefficient data may be associated with a mapping relationship for the input data X(i,j) 210a-c to the output data B (u,v) 220a-c. For example, the coefficient data may represent non-linear mappings of the input data X(i,j) 210a-c to the output data B (u,v) 220a-c. In some examples, the non-linear mappings of the coefficient data may represent a Gaussian function, a piece-wise linear function, a sigmoid function, a thin-plate-spline function, a multi-quadratic function, a cubic approximation, an inverse multi-quadratic function, or combinations thereof. In some examples, some or all of the memory look-up units 214a-c, 218a-c may be deactivated. For example, one or more of the memory look-up units 214a-c, 218a-c may operate as a gain unit with the unity gain. In such a case, the instructions 117 may be executed to facilitate selection of a unity gain processing mode for some or all of the memory look-up units 214a-c, 218a-c.

Each of the multiplication unit/accumulation units 212a-c, 216a-c may include multiple multipliers, multiple accumulation unit, or and/or multiple adders. Any one of the multiplication unit/accumulation units 212a-c, 216a may be implemented using an ALU. In some examples, any one of the multiplication unit/accumulation units 212a-c, 216a-c can include one multiplier and one adder that each perform, respectively, multiple multiplications and multiple additions. The input-output relationship of a multiplication/accumulation unit 212, 216 may be represented as:

$$B_{out} = \sum_{i=1}^{I} C_i * B_{in}(i) \qquad (2)$$

where "I" represents a number to perform the multiplications in that unit, $C_i$ the coefficients which may be accessed from a memory, such as memory 202, and $B_m(i)$ represents a factor from either the input data X(i,j) 210a-c or an output from multiplication unit/accumulation units 212a-c, 216a-c. In an example, the output of a set of multiplication unit/accumulation units, $B_{out}$, equals the sum of coefficient data, $C_i$ multiplied by the output of another set of multiplication unit/accumulation units, $B_m(i)$. $B_{in}(i)$ may also be the input data such that the output of a set of multiplication unit/accumulation units, $B_{out}$, equals the sum of coefficient data, $C_i$ multiplied by input data.

Figure 3:
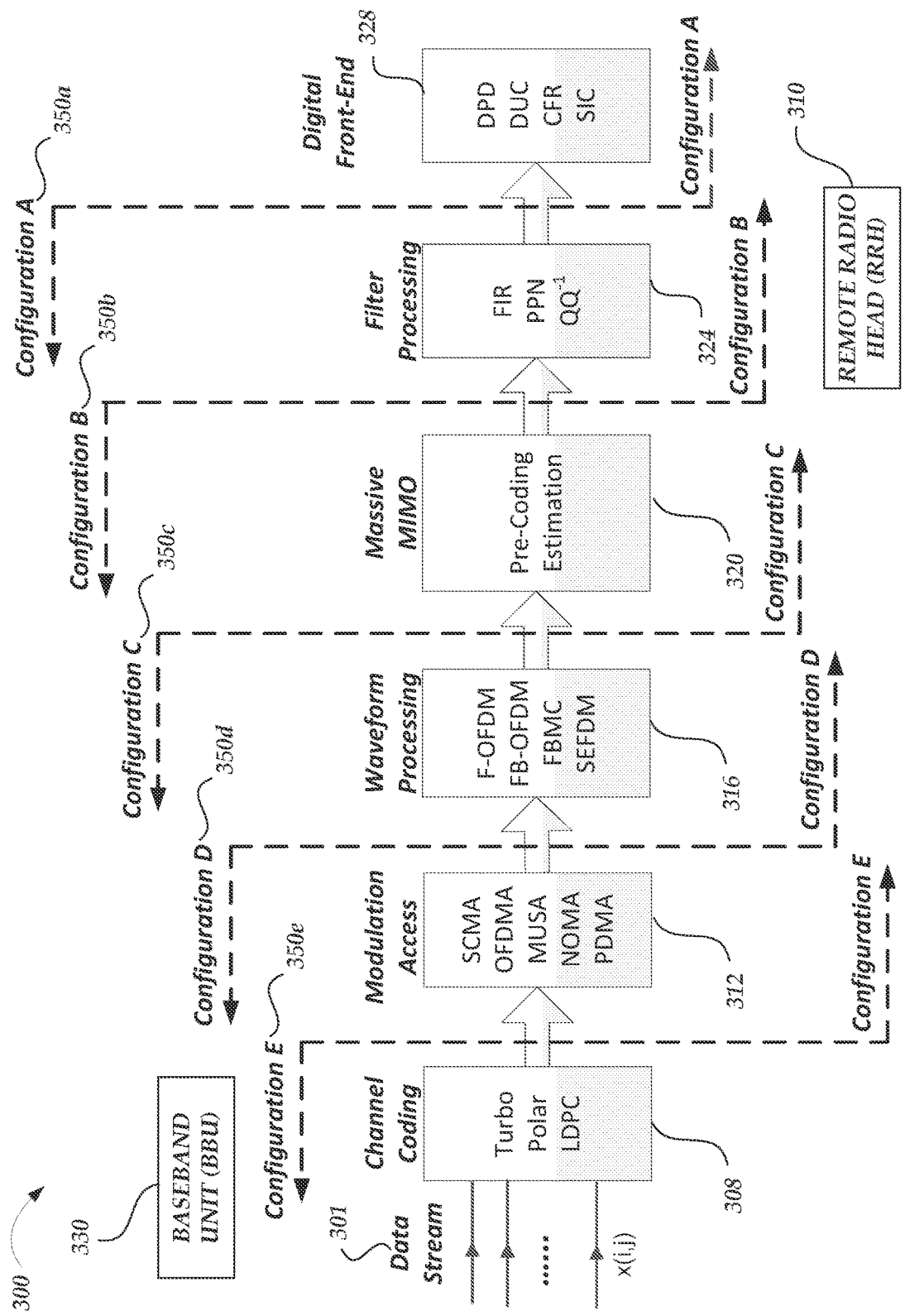
FIG. 3 is a schematic illustration of a computing system arranged in accordance with examples described herein.

FIG. 3 is a schematic illustration of a computing system 300 arranged in accordance with examples described herein. The computing system 300 includes a BBU 330 and a RRH 310. While not depicted as coupled in FIG. 3, the BBU 330 and the RRH 310 may be coupled via a fronthaul link, in an analogous manner to how the BBU 130 and the RRH 110 are coupled via the fronthaul link 140 in FIG. 1. The computing system 300 may be configured to implement various configuration modes 350a-350e, with each configuration mode allocating a wireless processing stage to either the BBU 330 or the RRH 310, as indicated by the directional dotted arrows pointing towards either the BBU 330 or the RRH 310. The computing system 300 receives input data x (i,j) 301 and performs wireless processing stages on the input data. The BBU 330 and the RRH 310 operate in conjunction upon the input data x (i,j) 301 to perform various wireless processing stages, with the operation of the wireless processing stage dependent on the configuration mode 350a-e.

The wireless processing stages of FIG. 3 include channel coding 308, modulation access 312, waveform processing 316, massive MIMO 320, filter processing 324, and digital front-end 328. Chanel coding 308 may include Turbo coding, polar coding, or low-density parity-check (LDPC) coding. It can be appreciated that channel coding 308 can include various types of channel coding. Modulation access 312 may include sparse code multiple access (SCMA), orthogonal frequency division multiple access (OFDMA), multi-user shared access (MUSA), non-orthogonal multiple access (NOMA), and/or polarization division multiple access (PDMA). Waveform processing 316 may include Filtered-Orthogonal Frequency Division Multiplexing (F-OFDM), Filter-Bank Frequency Division Multiplexing (FB-OFDM), Spectrally Efficient Frequency Division Multiplexing (SEFDM), and/or Filter Bank Multicarrier (FBMC). It can be appreciated that modulation access 312 can include various types of modulation access. The Massive MIMO 320 may include pre-coding estimation and various other functionalities associated with Massive MIMO. Filter processing 324 may include various types of digital filters, such as a finite impulse response (FIR) filter, a poly-phase network (PPN) filter, and/or $QQ^{-1}$ filter, which may refer to a filter that adjusts for compression and decompression of data. The digital front-end 328 may include baseband processing of a wireless transmitter or a wireless receiver. Such a digital front-end may include various functionalities for operating as a digital front-end transmitter or receiver, such as: an analog-to-digital conversion (ADC) processing, digital-to-analog (DAC) conversion processing, digital up conversion (DUC), digital down conversion (DDC), direct digital synthesizer (DDS) processing, DDC with DC offset compensation, digital pre-distortion (DPD), peak-to-average power ratio (PAPR) determinations, crest factor reduction (CFR) determinations, pulse-shaping, image rejection, delay/gain/imbalance compensation, noise-shaping, numerical controlled oscillator (NCO), and/or self-interference cancellation (SIC).

It can be appreciated that the RRH 310 may operate as a wireless transmitter or a wireless receiver (or both as multiplexing wireless transceiver). While depicted in FIG. 3 with the RRH 310 operating as a wireless transmitter (by receiving a processed input data stream x (i,j) 301 from the BBU 330), it can be appreciated that the RRH 310 may operate as a wireless receiver that receives a transmitted wireless signal and processes that signal, according to wireless processing stages allocated to the RRH 310. The data flow may flow the opposite way to the depiction of FIG. 3, with the functionalities of the various wireless processing stages inverted. For example, in a configuration mode E 350e, the BBU 330 may receive an intermediate processing result from the RRH 310 and decode that intermediate processing result at the wireless processing stage associated with channel coding 308.

Upon determination of a configuration mode or upon receiving a configuration mode selection, the computing system 300 may allocate the wireless processing stages 308, 312, 316, 320, 324, and 328 to either the BBU 330 or the RRH 310. The configuration mode A 350a configures the RRH 310 to perform the one wireless processing stage, the digital front-end 328. In configuration mode A 350a, the other wireless processing stages, channel coding 308, modulation access 312, waveform processing 316, massive MIMO 320, and filter processing 324, are performed by the BBU 330.

The computing system 300 may receive an additional configuration mode selection or determine a different configuration mode, based at least on processing times of the BBU 330 and the RRH 310. When a different configuration mode is specified, the BBU 330 and the RRH 310 may allocate processing unit(s) of each accordingly to accommodate the different configuration mode. Each configuration mode 350a-350e may be associated with a different set of coefficients for both the BBU 330 and the RRH 310 that is to be mixed with either the input data x (i,j) 301 or an intermediate processing result. Coefficients may be also associated with specific wireless protocols, such as 5G wireless protocols, such that the BBU 330 and the RRH 310 may be processing according to different wireless protocols. The intermediate processing results may be any processing result received by the other entity (e.g., the RRH 310 or the BBU 330), upon completion of processing by the initial entity (e.g., the BBU 330 or the RRH 310, respectively). As depicted in FIG. 3, various configuration modes 350a-350e are possible.

Figure 4A:
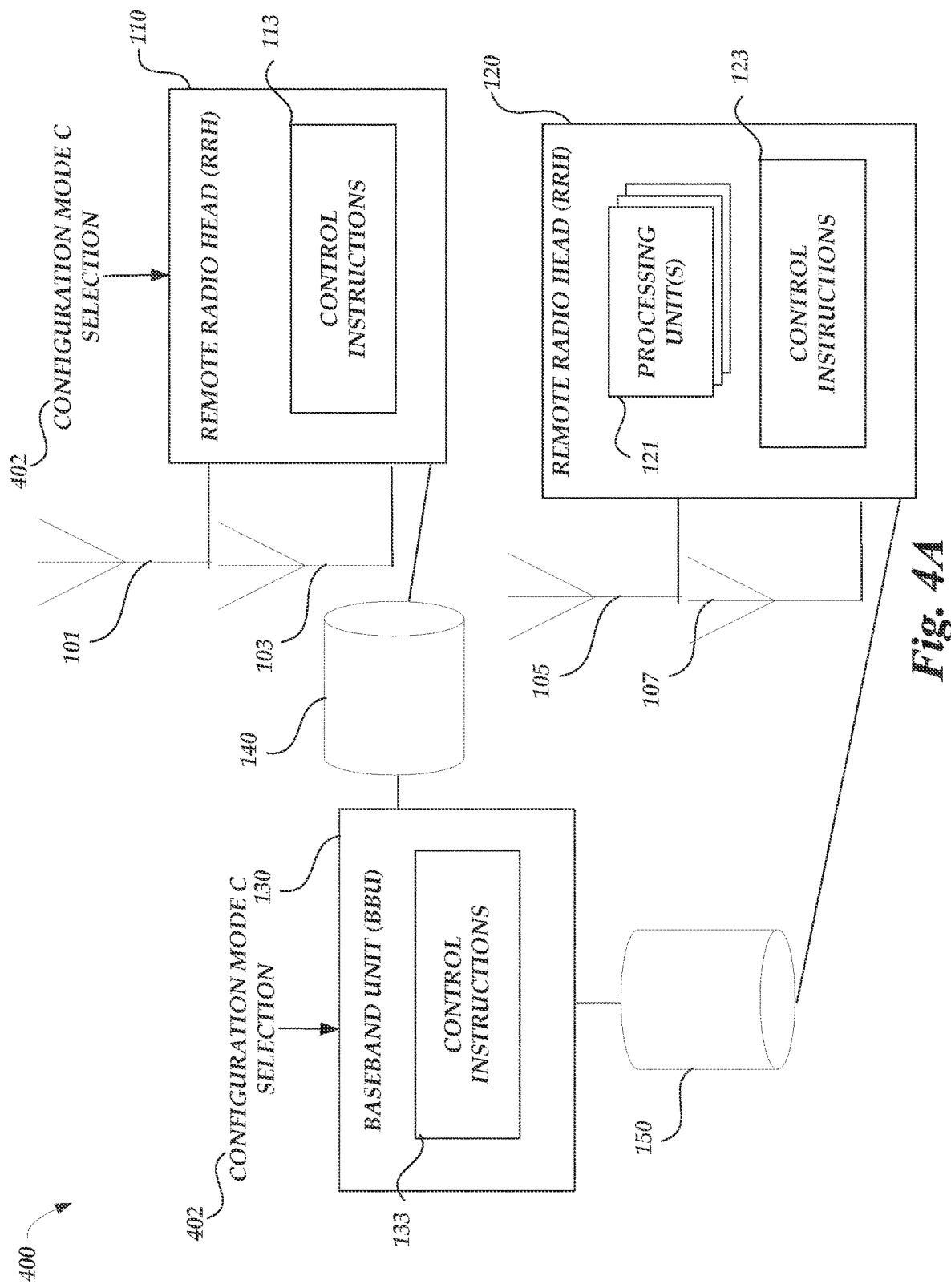
FIG. 4A-4D are schematic illustrations of a computing system arranged in accordance with examples described herein.

FIGS. 4A-4D are schematic illustrations of a computing system 400 arranged in accordance with some of the configuration modes described in FIG. 3. With reference to FIG. 4A, the computing system 400 may receive a configuration mode C selection 402 from an external user or computing system. A configuration mode C selection 402 may specify that the configuration mode C 350c is to be configured for the BBU 130 and the RRH 110. The RRH 120 may not receive the configuration mode C selection 402 and may operate according to a different configuration mode with the BBU 130. Upon receiving the configuration mode C selection 402 at the BBU 130, execution of the control instructions 133 may include configuration of the BBU 130 to operate with the wireless processing stages associated with the configuration mode C 350c. In some examples, execution of the control instructions 133 may include allocation of the one or more processing unit(s) 131 (not depicted) of a reconfigurable fabric in the BBU 130 to operate according to the configuration mode C 350c. Execution of the control instructions 133 may include loading instruction sets into the allocated one or more processing unit(s) 131 that specify mixing input data (e.g., an input data stream) with coefficient data associated with the configuration mode C 350c for the BBU 130. The one or more processing unit(s) 131, implemented as processing unit 205, may retrieve, from a memory of the BBU 130 or an external memory, the coefficient data associated with the configuration mode C 350c for the BBU 130. Execution of the control instructions 113 may include allocation of the one or more processing unit(s) 111 (not depicted) of a reconfigurable fabric in the RRH 110 to operate according to the configuration mode C 350c. Execution of the control instructions 113 may include loading instruction sets into the allocated one or more processing unit(s) 111 that specify mixing input data (e.g., an intermediate processing result) with coefficient data associated with the configuration mode C 350c for the RRH 110. In some examples, the one or more processing unit(s) 111, implemented as processing unit 205, may retrieve, from a memory of the RRH 110 or an external memory, the coefficient data associated with the configuration mode C 350c for the RRH 110.

Figure 4B:
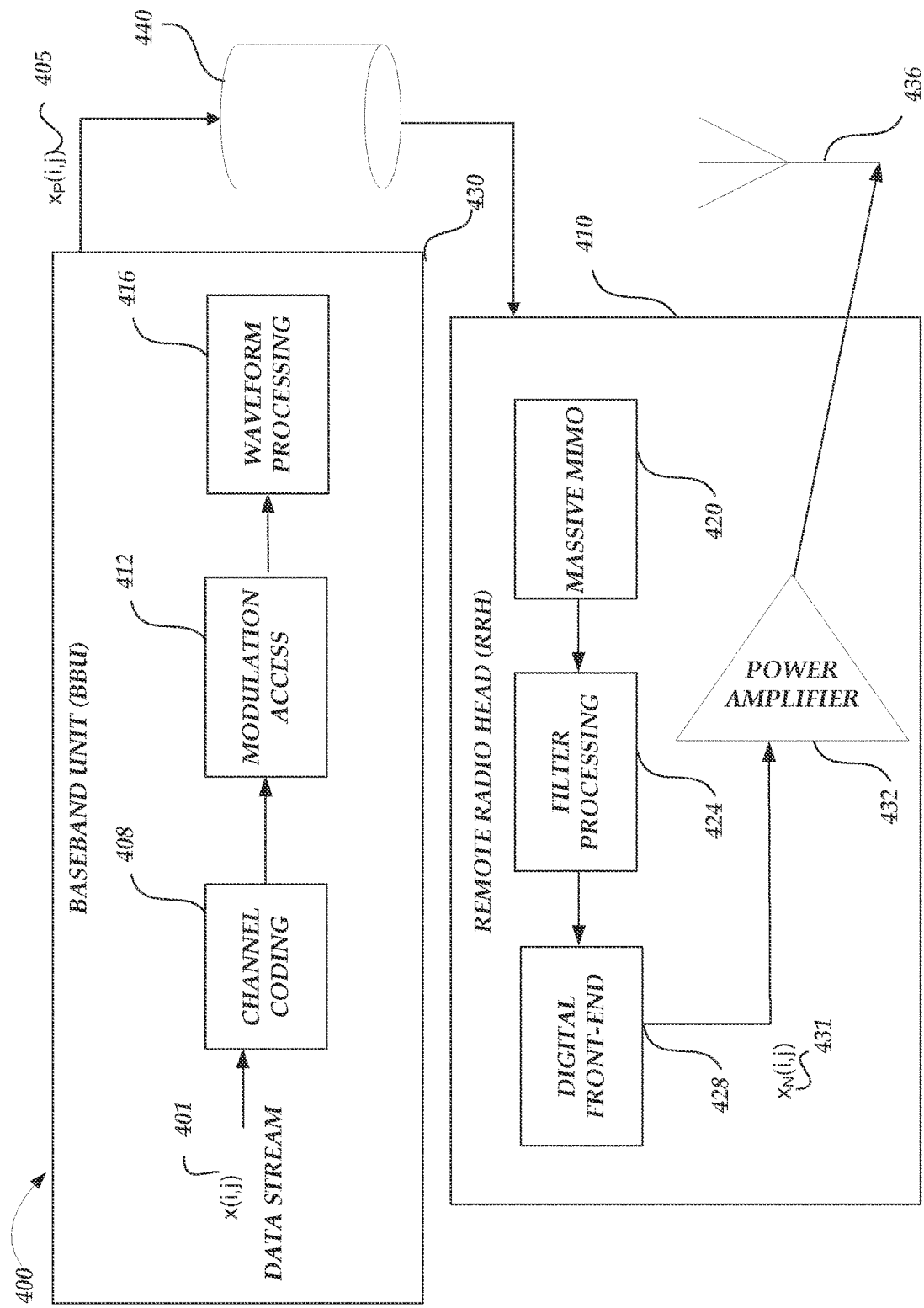

FIG. 4B depicts a BBU 430 and an RRH 410 configured according to a configuration mode C 350c. For example, the BBU 430 and the RRH 410 may be configured according to the configuration mode C 350c; upon receiving a configuration mode C selection 402 or upon a determination that an overall processing time of the computing system 400 may be optimized based on the processing time of the BBU 430 in configuration mode C, the transmission time of the fronthaul link 440, and the processing time of the RRH 410. For example, in the latter case of optimization, a processing time threshold may be compared to either of the processing times of the BBU 430 or the RRH 410. Based on the comparison, the execution of the control instructions 133 or control instructions 113 may include altering the configuration mode of the BBU 430 and the RRH 410 to the configuration mode C 350c. As depicted, the configuration mode C 350c specifies that certain wireless processing stages are allocated to the BBU 430 and other wireless processing stages are allocated to the RRH 410. The BBU 430 includes the wireless processing stages of channel coding 408, modulation access 412, and the waveform processing 416. The RRH 410 includes the wireless processing stages of massive MIMO 420, filter processing 424, and digital front-end 428. The RRH 410 may also include a power amplifier 432 that is coupled to an antenna 436 for transmission of a wireless communication signal.

The BBU 430 may receive an input data stream x(i,j) 401 that is processed in the wireless processing stages of channel coding 408, modulation access 412, and the waveform processing 416 to generate an intermediate processing result $x_P(i,j)$ 405. The intermediate processing result $x_P(i,j)$ 405 may be compressed according to a compression algorithm for transmission over the fronthaul link 440. The RRH 410 may receive and decompress the intermediate processing result $x_P(i,j)$ 405 for further processing at the wireless processing stages allocated in the RRH 410. In configuration mode C 350c, the wireless processing stages at the RRH 410 are the massive MIMO 420, filter processing 424, and the digital front-end 428. The RRH 410 may process the intermediate processing result $x_P(i,j)$ 405 to generate an output data stream $x_N(i,j)$ 431. The output data stream $x_N(i,j)$ 431 may be amplified by the power amplifier 432 and transmitted as a wireless communication signal via antenna 436.

Figure 4C:
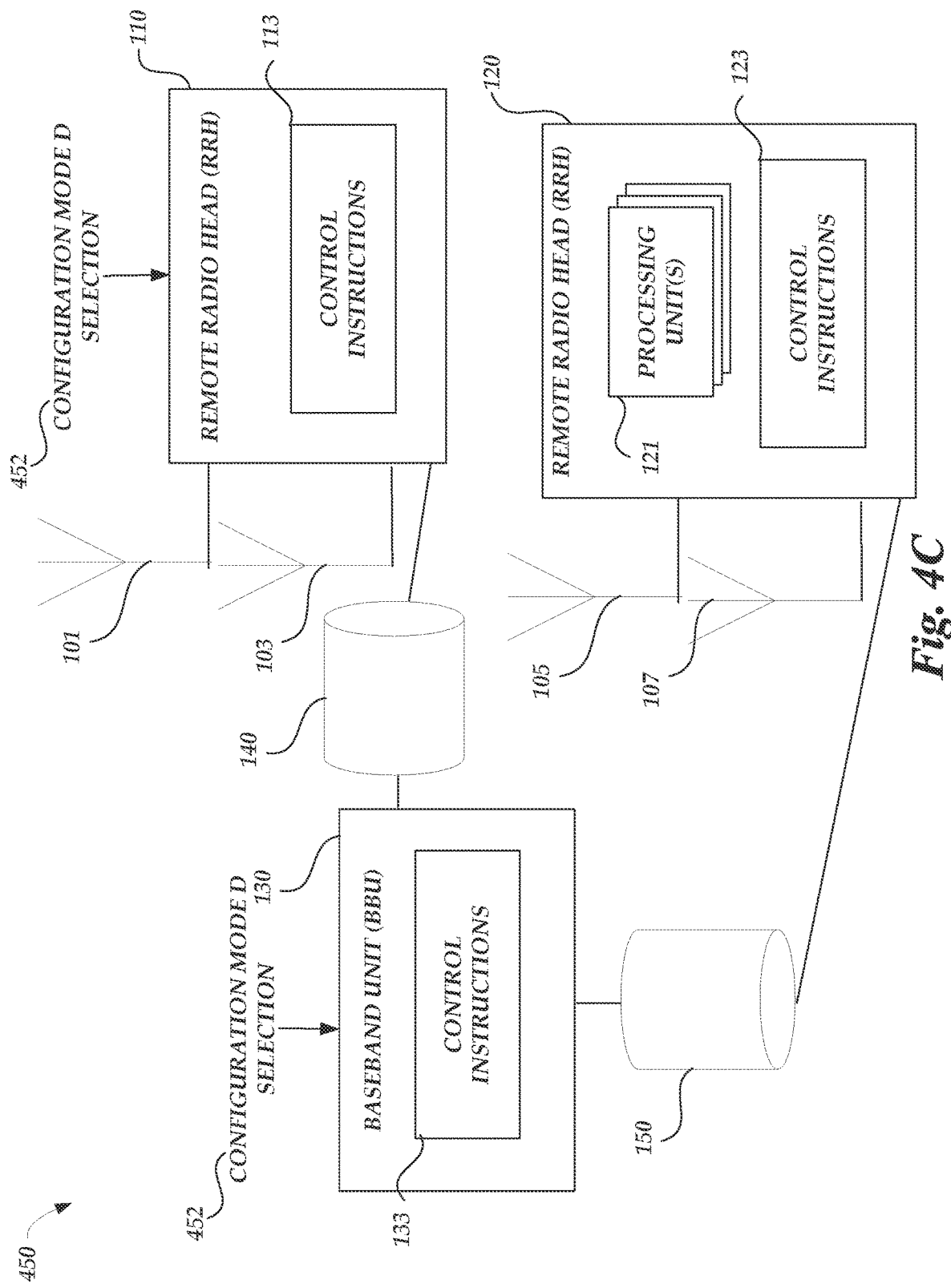

With reference to FIG. 4C, the computing system 450 may receive a configuration mode D selection 452 from an external user or computing system. A configuration mode D selection 452 may specify that the configuration mode D 350b is to be configured for the BBU 130 and the RRH 110. The RRH 120 may not receive the configuration mode B selection 452 and may operate according to a different configuration mode with the BBU 130. Upon receiving the configuration mode D selection 452 at the BBU 130, execution of the control instructions 133 may include configuring the BBU 130 to operate with the wireless processing stages associated with the configuration mode D 350b. Execution of the control instructions 133 may include allocating one or more processing unit(s) 131 (not depicted) of a reconfigurable fabric in the BBU 130 to operate according to the configuration mode D 350b. Execution of the control instructions 133 may include loading instruction sets into the allocated one or more processing unit(s) 131 that specify mixing input data (e.g., an input data stream) with coefficient data associated with the configuration mode D 350b for the BBU 130. The one or more processing unit(s) 131, implemented as processing unit 205, may retrieve, from a memory of the BBU 130 or an external memory, the coefficient data associated with the configuration mode D 350b for the BBU 130. Execution of the control instructions 113 may include allocating one or more processing unit(s) 111 (not depicted) of a reconfigurable fabric in the RRH 110 to operate according to the configuration mode D 350b. Execution of the control instructions 113 may include loading instruction sets into the allocated one or more processing unit(s) 111 that specify mixing input data (e.g., an intermediate processing result) with coefficient data associated with the configuration mode D 350b for the RRH 110. The one or more processing unit(s) 111, implemented as processing unit 205, may retrieve, from a memory of the RRH 110 or an external memory, the coefficient data associated with the configuration mode D 350b for the RRH 110.

Figure 4D:
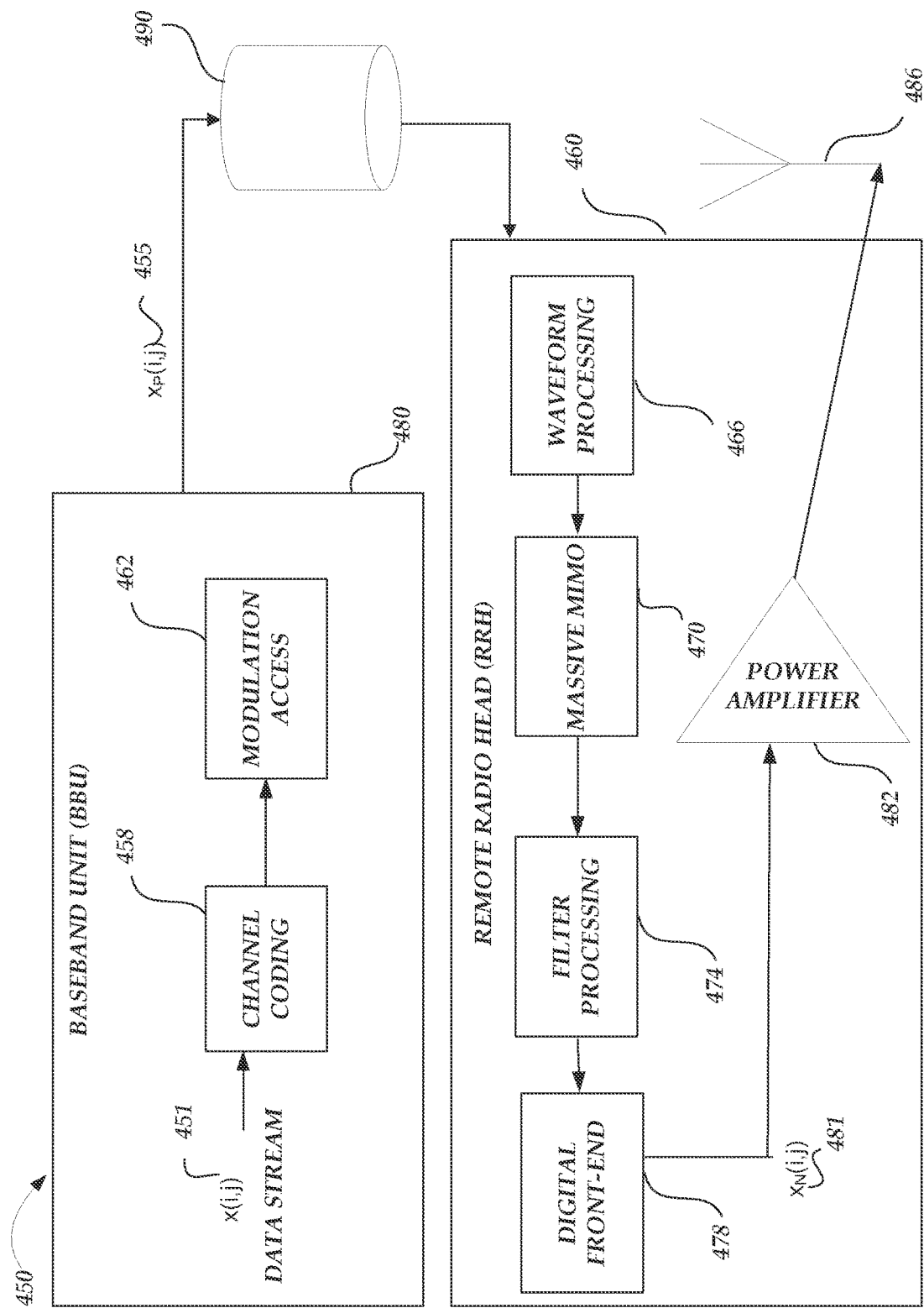

FIG. 4D depicts a BBU 480 and an RRH 460 configured according to a configuration mode D 350b. For example, the BBU 480 and the RRH 460 may be configured according to the configuration mode D 350b; upon receiving a configuration mode D selection 452 or upon a determination that an overall processing time of the computing system 400 may be optimized based on the processing time of the BBU 480 in configuration mode D, the transmission time of the fronthaul link 490, and the processing time of the RRH 460. For example, in the latter case of optimization, a processing time threshold may be compared to either of the processing times of the BBU 480 or the RRH 460. Based on the comparison, execution of the control instructions 133 or control instructions 113 may include altering the configuration mode of the BBU 480 and the RRH 460 to the configuration mode D 350b. As depicted, the configuration mode D 350b specifies that certain wireless processing stages are allocated to the BBU 480 and other wireless processing stages are allocated to the RRH 460. The BBU 480 includes the wireless processing stages of channel coding 458 and modulation access 462. The RRH 460 includes the wireless processing stages of waveform processing 456, massive MIMO 470, filter processing 474, and digital front-end 478. The RRH 460 may also include a power amplifier 482 that is coupled to an antenna 486 for transmission of a wireless communication signal.

The BBU 480 may receive an input data stream x(i,j) 451 that is processed in the wireless processing stages of channel coding 458 and modulation access 462 to generate an intermediate processing result $x_P(i,j)$ 455. The intermediate processing result $x_P(i,j)$ 455 may be compressed according to a compression algorithm for transmission over the fronthaul link 490. The RRH 460 may receive and decompress the intermediate processing result $x_P(i,j)$ 455 for further processing at the wireless processing stages allocated in the RRH 460. In configuration mode D 350b, the wireless processing stages at the RRH 460 are the waveform processing 466, massive MIMO 470, filter processing 474, and the digital front-end 478. The RRH 460 may process the intermediate processing result $x_P(i,j)$ 455 to generate an output data stream $x_N(i,j)$ 481. The output data stream $x_N(i,j)$ 481 may be amplified by the power amplifier 482 and transmitted as a wireless communication signal via antenna 486.

Figure 5:
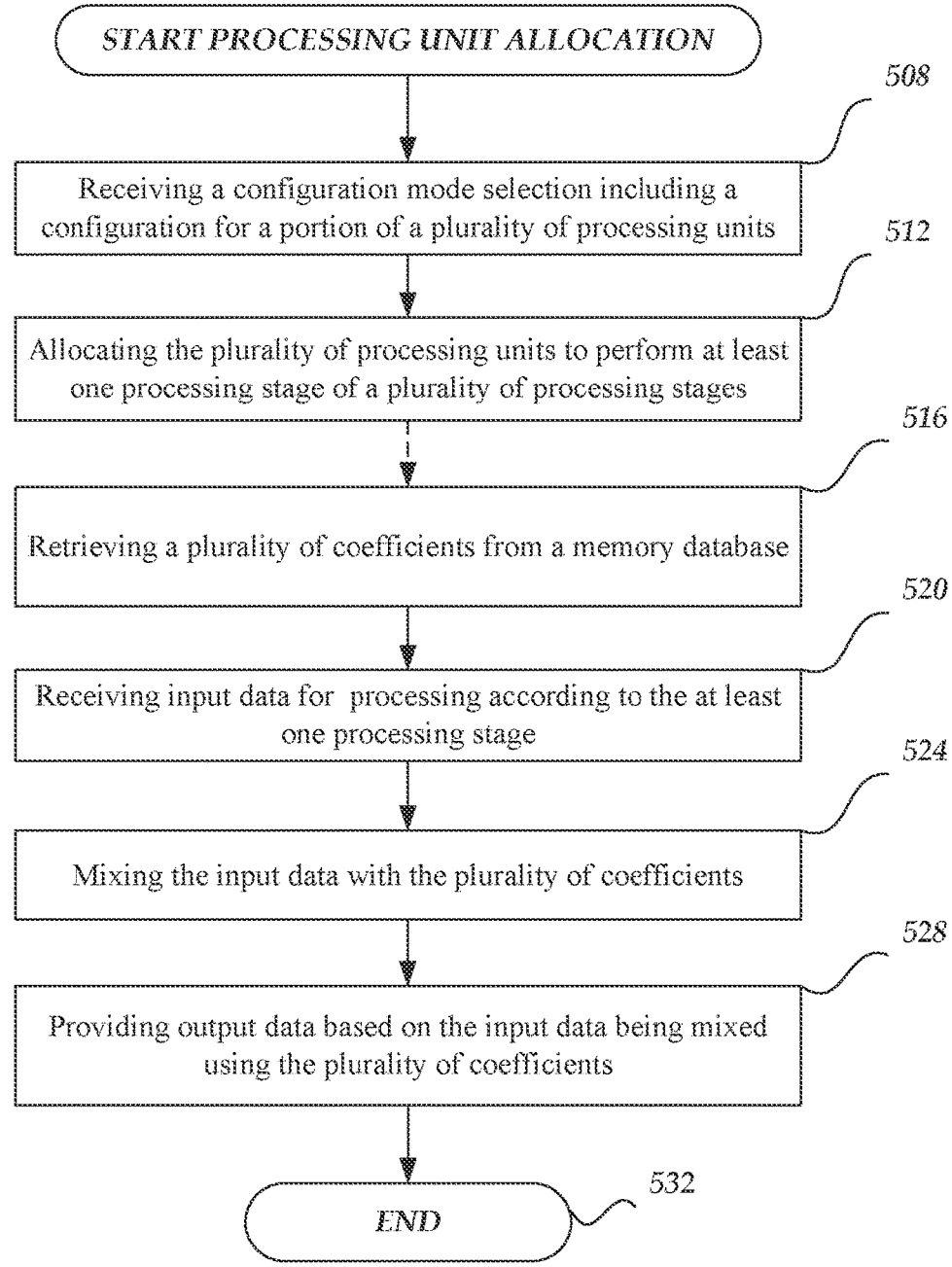
FIG. 5 is a flowchart of a method arranged in accordance with examples described herein.

FIG. 5 is a flowchart of a method 500 in accordance with examples described herein. Example method 500 may be implemented using, for example, computing system 100 in FIG. 1, computing system 300 in FIG. 3, or any system or combination of the systems depicted in FIG. 14D described herein. In some examples, the blocks in example method 500 may be performed by a computing system such as a computing system 400 of FIG. 4 implementing processing units in the reconfigurable fabrics therein as a processing unit 205 of FIG. 2. The operations described in blocks 508-532 may also be stored as control instructions in a computer-readable medium at a BBU or an RRH.

Example method 500 may begin the processing allocation method. The method 500 may include a block 508 that recites "receiving a configuration mode selection including a configuration for a portion of a plurality of processing units." The configuration mode selection may be received as a selection from a touchscreen of an external computing device that communicates with a computing system, such as computing system 100. Configuration mode selections may be received by any BBU or RRH configured to receive such selections and which may be configured to allocate respective processing units of a respective reconfigurable fabric according to the configuration mode. Block 508 may be followed by block 512 that recites "allocating the plurality of processing units to perform at least one processing stage of a plurality of processing stages."

As described herein, allocating processing units may include loading certain processing units of an RRH and/or a BBU with instructions sets that execute certain wireless processing stages associated with a wireless protocol. For example, a computing system may operate in a specific configuration mode that partitions a wireless processing path into separate wireless processing stages at the RRH and/or the BBU. Block 512 may be followed by block 516 that recites "retrieving a plurality of coefficients from a memory database."

As described herein, any of the processing units at the RRH and/or the BBU may retrieve coefficients for mixing with input data; for example, utilizing a memory look-up unit. For example, the memory look-up unit may store associations between coefficients and wireless protocols and/or configuration modes described herein. For example, the processing unit may request the coefficients from a memory part of the implementing reconfigurable fabric, from a memory part of an external computing device, or from a memory implemented in a cloud-computing device. In turn, the memory may send the plurality of coefficients as requested by the respective processing units.

Block 516 may be followed by block 520 that recites "receiving input data for processing according to the at least one processing stage." As described herein, a BBU may receive an input data stream to be transmitted, and an RRH may receive an intermediate processing result as input data to be processed at the RRH. Or as vice versa, the RRH may receive an input data stream received at an antenna, and the BBU may receive an intermediate processing result as input data to be processed at the BBU. In either case, the input data may be received according to a format specified by the first processing stage of the processing entity, such as the RRH or the BBU. In an example, if the first processing stage of an RRH is a massive MIMO processing stage, then the RRH may receive the input data in a format as output by a waveform processing stage, such as data in a FBMC format. Block 520 may be followed by block 524 that recites "mixing the input data using the plurality of coefficients."

As described herein, the processing unit utilizes the plurality of coefficients such that mixing the coefficients with input data generates output data that reflects the processing of the input data with coefficients by the circuitry of FIG. 2. For example, various ALUs in an integrated circuit may be configured to operate as the circuitry of FIG. 2, thereby mixing the input data with the coefficients as described herein. In some examples, various hardware platforms may implement the circuitry of FIG. 2, such as an ASIC, a DSP implemented as part of a FPGA, or a system-on-chip. Block 524 may be followed by block 528 that recites "providing output data based on the input data being mixed using the plurality of coefficients." As described herein, the output data may be provided to another entity including a reconfigurable fabric such as an RRH and/or a BBU, or an antenna for wireless, RF transmission. Block 528 may be followed by block 532 that ends the example method 500. In some examples, the blocks 508 and 516 may be optional blocks. For example, rather than receiving a configuration mode selection at block 508, execution of the control instructions may include a determination of a configuration mode based on various processing times of a computing system including entities with processing times and couplings that may include transmission times (e.g., a fronthaul link coupling the entities with processing times).

The blocks included in the described example methods 500 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 6:
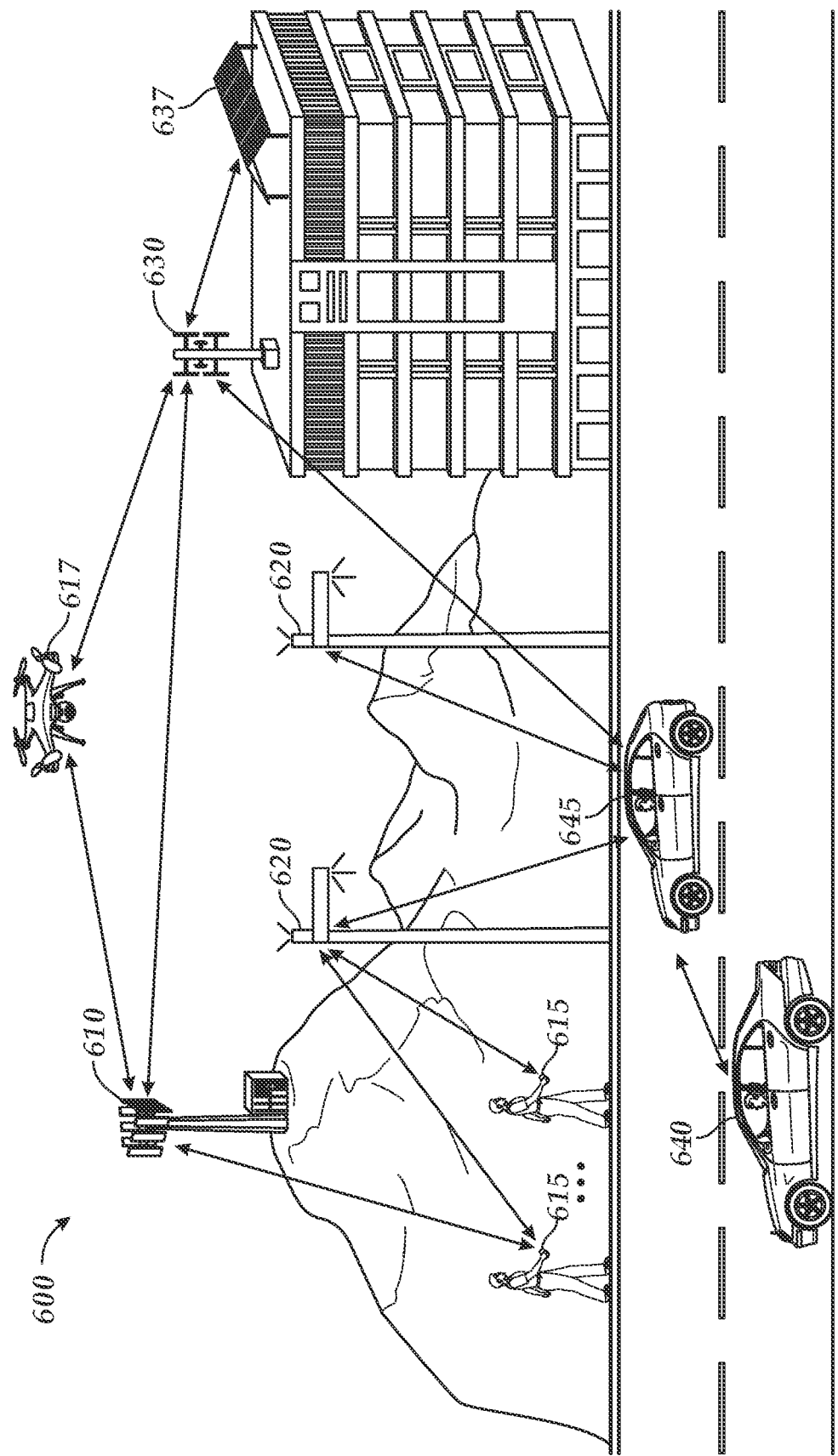
FIG. 6 is a schematic illustration of a wireless communications system arranged in accordance with aspects of the present disclosure.

FIG. 6 illustrates an example of a wireless communications system 600 in accordance with aspects of the present disclosure. The wireless communications system 600 includes a base station 610, a mobile device 615, a drone 617, a small cell 630, and vehicles 640, 645. The base station 610 and small cell 630 may be connected to a network that provides access to the Internet and traditional communication links. The system 600 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g. 24 GHz).

Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 600 may depict aspects of a radio access network (RAN), and system 600 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 610, communication devices 620, and small cells 630 may be coupled with the core network or with one another, or both, via wired or wireless backhaul links (e.g., S1 interface, X2 interface, etc.).

The system 600 may provide communication links connected to devices or "things," such as sensor devices, e.g., solar cells 637, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 1, 5, 10, or 20 MHz, for example.

Additionally or alternatively, the IoT may include devices or things operating at different frequencies than traditional cellular technology to facilitate use of the wireless spectrum. For example, an IoT framework may allow multiple devices in system 600 to operate at a sub-6 GHz band or other industrial, scientific, and medical (ISM) radio bands where devices may operate on a shared spectrum for unlicensed uses. The sub-6 GHz band may also be characterized as an NB-IoT band. For example, in operating at low frequency ranges, devices providing sensor data for "things," such as solar cells 637, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

In such a 5G framework, devices may perform functionalities performed by base stations in other mobile networks (e.g., UMTS or LTE), such as forming a connection or managing mobility operations between nodes (e.g., handoff or reselection). For example, mobile device 615 may receive sensor data from the user utilizing the mobile device 615, such as blood pressure data, and may transmit that sensor data on a narrowband IoT frequency band to base station 610. In such an example, some parameters for the determination by the mobile device 615 may include availability of licensed spectrum, availability of unlicensed spectrum, and/or time-sensitive nature of sensor data. Continuing in the example, mobile device 615 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 615 may form device-to-device (D2D) connections with other mobile devices or other elements of the system 600. For example, the mobile device 615 may form RFID, WiFi, MultiFire, Bluetooth, or Zigbee connections with other devices, including communication device 620 or vehicle 645. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 615 to provide information (e.g., sensor data) collected on different frequency bands than a frequency band determined by mobile device 615 for transmission of that information.

Moreover, some communication devices may facilitate ad-hoc networks, for example, a network being formed with communication devices 620 attached to stationary objects) and the vehicles 640, 645, without a traditional connection to a base station 610 and/or a core network necessarily being formed. Other stationary objects may be used to support communication devices 620, such as, but not limited to, trees, plants, posts, buildings, blimps, dirigibles, balloons, street signs, mailboxes, or combinations thereof. In such a system 600, communication devices 620 and small cell 630 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 615 communicating with base station 610 on a cellular communication band.

The communication devices 620 may form wireless networks, operating in either a hierarchal or ad-hoc network fashion, depending, in part, on the connection to another element of the system 600. For example, the communication devices 620 may utilize a 700 MHz communication frequency to form a connection with the mobile device 615 in an unlicensed spectrum, while utilizing a licensed spectrum communication frequency to form another connection with the vehicle 645. Communication devices 620 may communicate with vehicle 645 on a licensed spectrum to provide direct access for time-sensitive data, for example, data for an autonomous driving capability of the vehicle 645 on a 5.9 GHz band of Dedicated Short Range Communications (DSRC).

Vehicles 640 and 645 may form an ad-hoc network at a different frequency band than the connection between the communication device 620 and the vehicle 645. For example, for a high bandwidth connection to provide time-sensitive data between vehicles 640, 645, a 24 GHz mmWave band may be utilized for transmissions of data between vehicles 640, 645. For example, vehicles 640, 645 may share real-time directional and navigation data with each other over the connection while the vehicles 640, 645 pass each other across a narrow intersection line. Each vehicle 640, 645 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 620 and the vehicle 645, for example, for processing of image data received at both vehicle 645 and vehicle 640, as transmitted by the vehicle 640 to vehicle 645 over the 24 GHz mmWave band. While shown as automobiles in FIG. 6, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 600 in other mmWave bands or other frequency bands, such as 28 GHz, 37 GHz, 38 GHz, 39 GHz, which may be licensed or unlicensed bands. In some cases, vehicles 640, 645 may share the frequency band that they are communicating on with other vehicles in a different network. For example, a fleet of vehicles may pass vehicle 640 and, temporarily, share the 24 GHz mmWave band to form connections among that fleet, in addition to the 24 GHz mmWave connection between vehicles 640, 645. As another example, communication device 620 may substantially simultaneously maintain a 700 MHz connection with the mobile device 615 operated by a user (e.g., a pedestrian walking along the street) to provide information regarding a location of the user to the vehicle 645 over the 5.9 GHz band. In providing such information, communication device 620 may leverage antenna diversity schemes as part of a massive MIMO framework to facilitate time-sensitive, separate connections with both the mobile device 615 and the vehicle 645. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 610 and small cell 630 may wirelessly communicate with devices in the system 600 or other communication-capable devices in the system 600 having at the least a sensor wireless network, such as solar cells 637 that may operate on an active/sleep cycle, and/or one or more other sensor devices. The base station 610 may provide wireless communications coverage for devices that enter its coverages area, such as the mobile device 615 and the drone 617. The small cell 630 may provide wireless communications coverage for devices that enter its coverage area, such as near the building that the small cell 630 is mounted upon, such as vehicle 645 and drone 617.

Generally, a small cell 630 may be referred to as a small cell and provide coverage for a local geographic region, for example, coverage of 200 meters or less in some examples. This may be contrasted with at macrocell, which may provide coverage over a wide or large area on the order of several square miles or kilometers. In some examples, a small cell 630 may be deployed (e.g., mounted on a building) within some coverage areas of a base station 610 (e.g., a macrocell) where wireless communications traffic may be dense according to a traffic analysis of that coverage area. For example, a small cell 630 may be deployed on the building in FIG. 6 in the coverage area of the base station 610 if the base station 610 generally receives and/or transmits a higher amount of wireless communication transmissions than other coverage areas of that base station 610. A base station 610 may be deployed in a geographic area to provide wireless coverage for portions of that geographic area. As wireless communications traffic becomes more dense, additional base stations 610 may be deployed in certain areas, which may alter the coverage area of an existing base station 610, or other support stations may be deployed, such as a small cell 630. Small cell 630 may be a femtocell, which may provide coverage for an area smaller than a small cell (e.g., 100 meters or less in some examples (e.g., one story of a building)).

While base station 610 and small cell 630 may provide communication coverage for a portion of the geographical area surrounding their respective areas, both may change aspects of their coverage to facilitate faster wireless connections for certain devices. For example, the small cell 630 may primarily provide coverage for devices surrounding or in the building upon which the small cell 630 is mounted. However, the small cell 630 may also detect that a device has entered its coverage area and adjust its coverage area to facilitate a faster connection to that device.

For example, a small cell 630 may support a massive MIMO connection with the drone 617, which may also be referred to as an unmanned aerial vehicle (UAV), and, when the mobile device 615 enters it coverage area, the small cell 630 adjusts some antennas to point directionally in a direction of the vehicle 645, rather than the drone 617, to facilitate a massive MIMO connection with the vehicle, in addition to the drone 617. In adjusting some of the antennas, the small cell 630 may not support as fast as a connection to the drone 617, as it had before the adjustment. However, the drone 617 may also request a connection with another device (e.g., base station 610) in its coverage area that may facilitate a similar connection as described with reference to the small cell 630, or a different (e.g., faster, more reliable) connection with the base station 610. Accordingly, the small cell 630 may enhance existing communication links in providing additional connections to devices that may utilize or demand such links. For example, the small cell 630 may include a massive M IMO system that directionally augments a link to vehicle 645, with antennas of the small cell directed to the vehicle 645 for a specific time period, rather than facilitating other connections (e.g., the small cell 630 connections to the base station 610, drone 617, or solar cells 937). In some examples, drone 617 may serve as a movable or aerial base station.

The wireless communications system 600 may include devices such as base station 610, communication device 620, and small cell 630 that may support several connections to devices in the system 600. Such devices may operate in a hierarchal mode or an ad-hoc mode with other devices in the network of system 600. While described in the context of a base station 610, communication device 620, and small cell 630, it can be appreciated that other devices that can support several connections with devices in the network may be included in system 600, including but not limited to: macrocells, femtocells, routers, satellites, and RFID detectors.

In various examples, the elements of wireless communication system 600, such as base station 610, a mobile device 615, a drone 617, communication device 620 a small cell 630, and vehicles 640, 645, may be implemented utilizing the systems, apparatuses, and methods described herein. For example, the entities of the computing system 100 described herein, such as the RRH 110, the RRH 120, and/or the BBU 130 shown in FIG. 1, may be implemented in any of the elements of communication system 600. For example, the RRH 110, 120 may be implemented using the base station 610 and small cell 630, respectively. The base station 610 and small cell 630 may communicate over the cloud to form a C-RAN network with a BBU 130 that may be implemented using a server or a combination of servers.

In some examples, the RRH 110 and/or the RRH 120 may be incorporated into other devices, such as mobile device 615, drone 617, communication device 620, of vehicles 640, 645. For example, the communication device 620 may be implemented as part of any of the processing systems 100, 200, 300, 400, 450 or method 500. In some examples, a fronthaul link 140 may be implemented over a wireless channel. For example, the mobile device 615 may be implemented as the RRH 110 and utilize a WiFi channel to communicate with communication device 620, being implemented as the BBU 130. In an example, the drone 617 and solar cells 637 may be implemented as the RRH 110 and the RRH 120 and utilize narrowband IoT channels as the respective fronthaul links 140, 150, respectively, to the small cell 630 being implemented as a BBU 130 for the specific configuration of the drone 617 and solar cells 637 communicating over the narrowband IoT channels. Additionally or alternatively, the small cell 630, at the same time as being implemented as a BBU 130, may be implemented as an RRH 110 that may communicate over the cloud to form a C-RAN network with a BBU 130 that may be implemented using a server or a combination of servers. The small cell 630 being implemented as a BBU 130 may receive RF signals from the vehicle 645 over a different frequency channel than the drone 617 or solar cells 637 communicating with the small cell 630. In various examples, the elements of communication system 600 may be implemented as part of any of the processing systems 100, 200, 300, 400, 450 or method 500.

Figure 7:
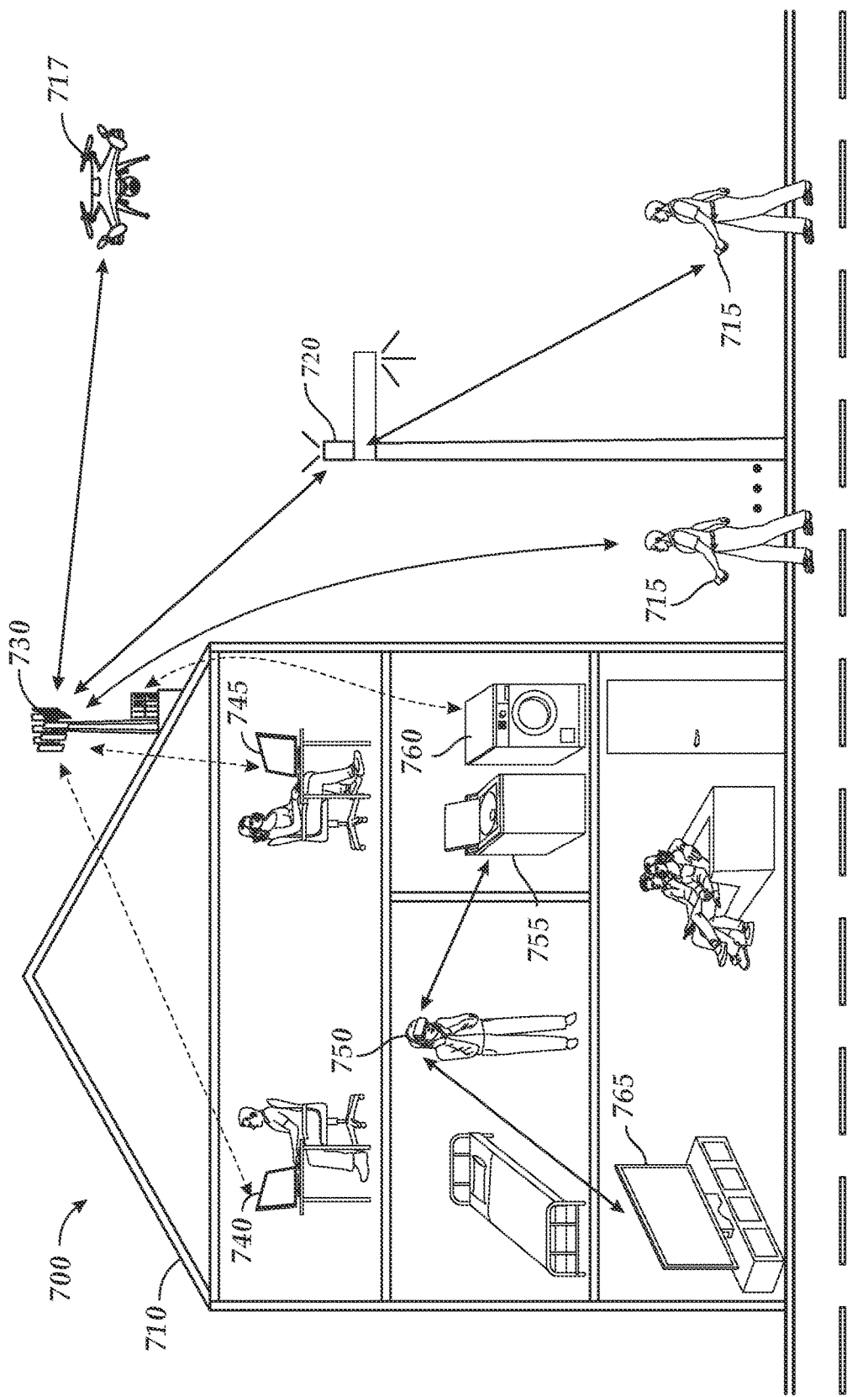
FIG. 7 is a schematic illustration of a wireless communications system arranged in accordance with aspects of the present disclosure.

FIG. 7 illustrates an example of a wireless communications system 700 in accordance with aspects of the present disclosure. The wireless communications system 700 includes a mobile device 715, a drone 717, a communication device 720, and a small cell 730. A building 710 also includes devices of the wireless communications system 700 that may be configured to communicate with other elements in the building 710 or the small cell 730. The building 710 includes networked workstations 740, 745, virtual reality device 750, IoT devices 755, 760, and networked entertainment device 765. In the depicted wireless communications system 700, IoT devices 755, 760 may be a washer and dryer, respectively, for residential use, being controlled by the virtual reality device 750. Accordingly, while the user of the virtual reality device 750 may be in different room of the building 710, the user may control an operation of the IoT device 755, such as configuring a washing machine setting. Virtual reality device 750 may also control the networked entertainment device 765. For example, virtual reality device 750 may broadcast a virtual game being played by a user of the virtual reality device 750 onto a display of the networked entertainment device 765.

The small cell 730 or any of the devices of building 710 may be connected to a network that provides access to the Internet and traditional communication links. Like the system 600, the wireless communications system 700 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g. 24 GHz). Additionally or alternatively, the wireless communications connections may support various modulation schemes as described above with reference to system 600. Wireless communications system 700 may operate and be configured to communicate analogously to system 600. Accordingly, similarly numbered elements of wireless communications system 700 and system 600 may be configured in an analogous way, such as communication device 620 to communication device, small cell 630 to small cell 730, etc.

Like the system 600, where elements of system 600 are configured to form independent hierarchal or ad-hoc networks, communication device 720 may form a hierarchal network with small cell 730 and mobile device 715, while an additional ad-hoc network may be formed among the small cell 730 network that includes drone 717 and some of the devices of the building 710, such as networked workstations 740, 745 and IoT devices 755, 760.

Devices in wireless communications system 700 may also form (D2D) connections with other mobile devices or other elements of the wireless communications system 700. For example, the virtual reality device 750 may form a narrowband IoT connections with other devices, including IoT device 755 and networked entertainment device 765. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 750.

In various examples, the elements of wireless communications system 700, such as the mobile device 715, the drone 717, the communication device 720, the small cell 730, the networked workstations 740, 745, the virtual reality device 750, the IoT devices 755, 760, and the networked entertainment device 765, may be implemented as part of any of the processing systems 100, 200, 300, 400, 450 or method 500. For example, the entities of the computing system 100 described herein, such as the RRH 110, the RRH 120, and/or the BBU 130 shown in FIG. 1, may be implemented in any of the elements of communication system 700. The RRH 110, 120 may be implemented using the communication device 720 and small cell 730, respectively. The communication device 720 and small cell 730 may communicate over the cloud to form a C-RAN network with a BBU 130 that may be implemented using a server or a combination of servers.

In some examples, the RRH 110 and/or the RRH 120 may be incorporated into other devices, such as the mobile device 715, the drone 717, the networked workstations 740, 745, the virtual reality device 750, the IoT devices 755, 760, and the networked entertainment device 765. For example, the IoT devices 755, 760 may be implemented as part of any of the processing systems 100, 200, 300, 400, 450 or method 500. In some examples, a fronthaul link 140 may be implemented over a wireless channel. For example, the networked entertainment device may be implemented as the RRH 110 and utilize a WiFi channel to communicate with virtual reality device 750, being implemented as the BBU 130. In an example, the IoT devices 755, 760 may be implemented as the RRH 110 and the RRH 120 and utilize narrowband IoT channels as the respective fronthaul links 140, 150, respectively, to the virtual reality device 750 and the small cell 730, each, respectively, being implemented as a BBU 130 for the specific configuration of the respective IoT device 755 and IoT device 760 communicating over the narrowband IoT channels. Additionally or alternatively, the small cell 730, at the same time as being implemented as a BBU 130, may be implemented as an RRH 110 that may communicate over the cloud to form a C-RAN network with a BBU 130 that may be implemented using a server or a combination of servers. The small cell 730 being implanted as a BBU 130 may receive RF signals from the mobile device 715 or drone 717 over a different frequency channel than the IoT device 760 communicating with the small cell 730.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
   receiving, at a first device, a first radio frequency signal (first RF signal) associated with a frequency band;
   mixing input data of the first RF signal with a first coefficient specific to a processing stage at a first mixing unit of a processing unit to provide first mixed data;
   mixing first mixed data of the first RF signal with a second coefficient specific to the processing stage at a second mixing unit of the processing unit to provide second mixed data; and
   transmitting, to a second device, a second RF signal including output data that is based on the second mixed data.

2. The method of claim 1, further comprising transmitting the second RF signal including the output data that is based on the second mixed data and is representative of the input data being processed according to the processing stage of a plurality of processing stages.

3. The method of claim 2, further comprising loading an instruction set, based on the configuration mode associated with the frequency band, into the processing units to perform the processing stage of the plurality of processing stages.

4. The method of claim 3, further comprising loading a second instruction set, based on the configuration mode associated with the frequency band, into the processing units to perform a subsequent processing stage of the plurality of processing stages.

5. The method of claim 1, further comprising transmitting the second RF signal including the output data that is based on the second mixed data and is representative of the input data being processed according to the processing stage and a second processing stage.

6. The method of claim 1, further comprising allocating the input data to the processing unit selected from a plurality of processing units.

7. The method of claim 1, further comprising mixing second mixed data of the first RF signal with a third coefficient specific to the processing stage at a third mixing unit of the processing unit to provide third mixed data, wherein the output data is based on the third mixed data.

8. The method of claim 1, further comprising retrieving, at the first device, the first and second coefficients specific to the configuration mode associated with the frequency band at a memory look-up unit.

9. The method of claim 1, wherein the frequency band corresponds to at least one of 1 MHz, 5 MHz, 10 MHz, 20 MHz, 700 MHz, 2.4 GHz, 24 GHz, or any narrowband IoT (NB-IoT) frequency band.

10. The method of claim 1, further comprising providing, from the first device, a wireless communications connection between the first device and the second device that operates in accordance with at least one of filter bank multi-carrier (FBMC), the generalized frequency division multiplexing (GFDM), universal filtered multi-carrier (UFMC) transmission, bi orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing.

11. The method of claim 1, further comprising performing at least one of an accumulation or a multiplication operation on the first data at the first mixing unit to provide the first mixed data.

12. An apparatus comprising:
   a processing unit; and
   non-transitory computer readable media encoded with control instructions which, when executed by the processing unit, is configured to cause the processing unit to:
      receive, a first radio frequency signal (first RF signal) associated with a frequency band;
      mix input data of the first RF signal with a first coefficient specific to a processing stage at a first mixing unit of the processing unit to provide first mixed data;

mix first mixed data of the first RF signal with a second coefficient specific to the processing stage at a second mixing unit of the processing unit to provide second mixed data; and transmit, to a device, a second RF signal including output data that is based on the second mixed data.

13. The apparatus of claim 12, wherein the control instructions, when executed by the processing unit, further cause the processing unit to transmit the second RF signal including the output data that is based on the second mixed data and is representative of the input data being processed according to the processing stage of a plurality of processing stages.

14. The apparatus of claim 13, wherein the control instructions, when executed by the processing unit, further cause the processing unit to load an instruction set, based on the configuration mode associated with the frequency band, into the processing units to perform the processing stage of the plurality of processing stages.

15. The apparatus of claim 12, wherein the control instructions, when executed by the processing unit, further cause the processing unit to transmit the second RF signal including the output data that is based on the second mixed data and is representative of the input data being processed according to the processing stage and a second processing stage.

16. The apparatus of claim 12, wherein the control instructions, when executed by the processing unit, further cause the processing unit to mix second mixed data of the first RF signal with a third coefficient specific to the processing stage at a third mixing unit of the processing unit to provide third mixed data, wherein the output data is based on the third mixed data.

17. The apparatus of claim 12, wherein the control instructions, when executed by the processing unit, further cause the processing unit to, retrieve the first and second coefficients specific to the configuration mode associated with the frequency band at a memory look-up unit.

* * * * *